(12) United States Patent
Bennett et al.

(10) Patent No.: US 7,864,752 B1
(45) Date of Patent: Jan. 4, 2011

(54) BEARER PATH RESOURCE MATCHING IN A WIRELESS COMMUNICATION NETWORK

(75) Inventors: Reed Bennett, Allen, TX (US); Gary B. Stephens, Richardson, TX (US); William Chotiner, Allen, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 839 days.

(21) Appl. No.: 11/501,339

(22) Filed: Aug. 9, 2006

(51) Int. Cl.
H04L 12/66 (2006.01)

(52) U.S. Cl. .................. 370/352; 370/353; 370/401

(58) Field of Classification Search .......... 370/352, 370/353, 401
See application file for complete search history.

(56) References Cited

U.S. PATENT DOCUMENTS

| 6,608,832 | B2 * | 8/2003 | Forslow | 370/353 |
| 7,292,687 | B2 * | 11/2007 | Graf et al. | 379/219 |
| 2005/0013281 | A1 * | 1/2005 | Milton et al. | 370/349 |
| 2005/0124299 | A1 * | 6/2005 | Scribano et al. | 455/68 |
| 2006/0239247 | A1 * | 10/2006 | Postmus | 370/352 |

OTHER PUBLICATIONS

Transcoder Free Operation, 3rd Generation Partnership Project 2 < http://www.3gpp2.org/Public_html/specs/S.R0096-0_v1.0_040319.pdf>.*

* cited by examiner

*Primary Examiner*—Vincent P Harper
*Assistant Examiner*—Michael Irace
(74) *Attorney, Agent, or Firm*—Garlick Harrison & Markison; Kevin L. Smith (57) ABSTRACT

Call setup in a wireless communication network that includes a circuit fabric and a packet fabric. The originating MSCe receives an origination message including a call termination identifier, and a predictive bearer path matching mode is determined. When the originating MSCe is in a first predictive bearer path matching mode, the originating MSC generates a bearer resource preference list based upon the termination identifier. The bearer resource preference list includes a predetermined priority order of a plurality of bearer path resource identifiers including at least one of a packet bearer resource identifier and a circuit bearer resource identifier. When the originating MSCe is in a second predictive bearer path matching mode, the MSCe generates a bearer resource preference list to indicate whether the originating MSCe couples to a packet bearer resource or a trunk bearer resource. The originating MSCe sends, in response to the origination message, the bearer resource preference list to an originating base station controller (BSC). The originating BSC matches an available bearer path resource of the originating BSC based upon the bearer resource preference list.

20 Claims, 5 Drawing Sheets

FIG. 2
wireless communication network environment 10

BEARER PATH RESOURCE MATCHING IN A WIRELESS COMMUNICATION NETWORK

BACKGROUND

1. Technical Field

The present invention relates generally to cellular wireless communication networks; and more particularly to resource matching for call setups.

2. Related Art

Cellular wireless networks include a "network infrastructure" that facilitates wireless communications with mobile terminals operating within a particular service coverage area. The network infrastructure couples to other network elements to support numerous types of communications, for example, the Public Switched Telephone Network (PSTN), the Internet, et cetera. The network infrastructure may route communications to other subscribing wireless units, to terminals coupled to the PSTN, to terminals coupled to the Internet, or to terminals coupled via another network to one of these networks.

Various wireless interface specifications have been developed to standardize wireless communications between the mobile terminals and the network infrastructure and between components that comprise the network infrastructure. Wireless interface specifications include, for example, the Advanced Mobile Phone Service (AMPS) specifications, the Global System for Mobile communications (GSM) specifications, the Code Division Multiple Access (CDMA) specifications, and the Time Division Multiple Access (TDMA) specifications. Generations of these specifications are generally referred to as first generation (1G), second generation (2G), third generation (3G), fourth generation (4G), et cetera. Each advancing generation of standards typically performs and/or supports a greater number of services, a greater number of features, and provides better communication qualities. These operating specifications may also be partially deployed from generation to generation, for example, 2G to 2.5G.

Network infrastructure upgrades are expensive and difficult to deploy, and to mitigate these adverse economic effects, have been implemented on a generational basis. That is, instead of network replacement, network infrastructures have been upgraded over time to include enhanced functions or features, and while still operating on or in combination with underlying transport infrastructures. Accordingly, network upgrades have introduced heterogeneous infrastructures that include trunk bearer path resources and packet bearer path resources instead of homogenous infrastructures having either one or the other. Each resource carries voice data, but the network infrastructure blindly assigns resources without regard to resource matching. When mismatches result, resource efficiency suffers, along with transmission quality and bandwidth.

Thus, a need exists for methods and apparatus for that may be employed to increase bearer connection efficiency through like-kind matching of bearer connections for both legacy mobile terminals and next generation mobile terminals operating within a next generation wireless communication systems.

SUMMARY

Provided is predictive bearer path resource matching for a call setup in an originating mobile switching center emulation (MSCe) of a wireless communication network that includes a circuit fabric and packet fabric. The originating MSCe receives an origination message including a call termination identifier, and determines a predictive bearer path matching mode of operation. When the originating MSCe is in a first predictive bearer path matching mode, the originating MSC generates a bearer resource preference list based upon the termination identifier. The bearer resource preference list includes a predetermined priority order of a plurality of bearer path resource identifiers including at least one of a packet bearer resource identifier and a circuit bearer resource identifier. When the originating MSCe is in a second predictive bearer path matching mode, the MSCe generates a bearer resource preference list to indicate whether to couple to a packet bearer resource or a trunk bearer resource. In either of the modes, possible available trunk resource identifiers are placed within the bearer resource preference list. The originating MSCe sends, in response to the origination message, the bearer resource preference list to an originating base station controller (BSC). The originating BSC matches an available bearer path resource of the originating BSC based upon the bearer resource preference list.

DETAILED DESCRIPTION OF THE DRAWINGS

Figure 1:
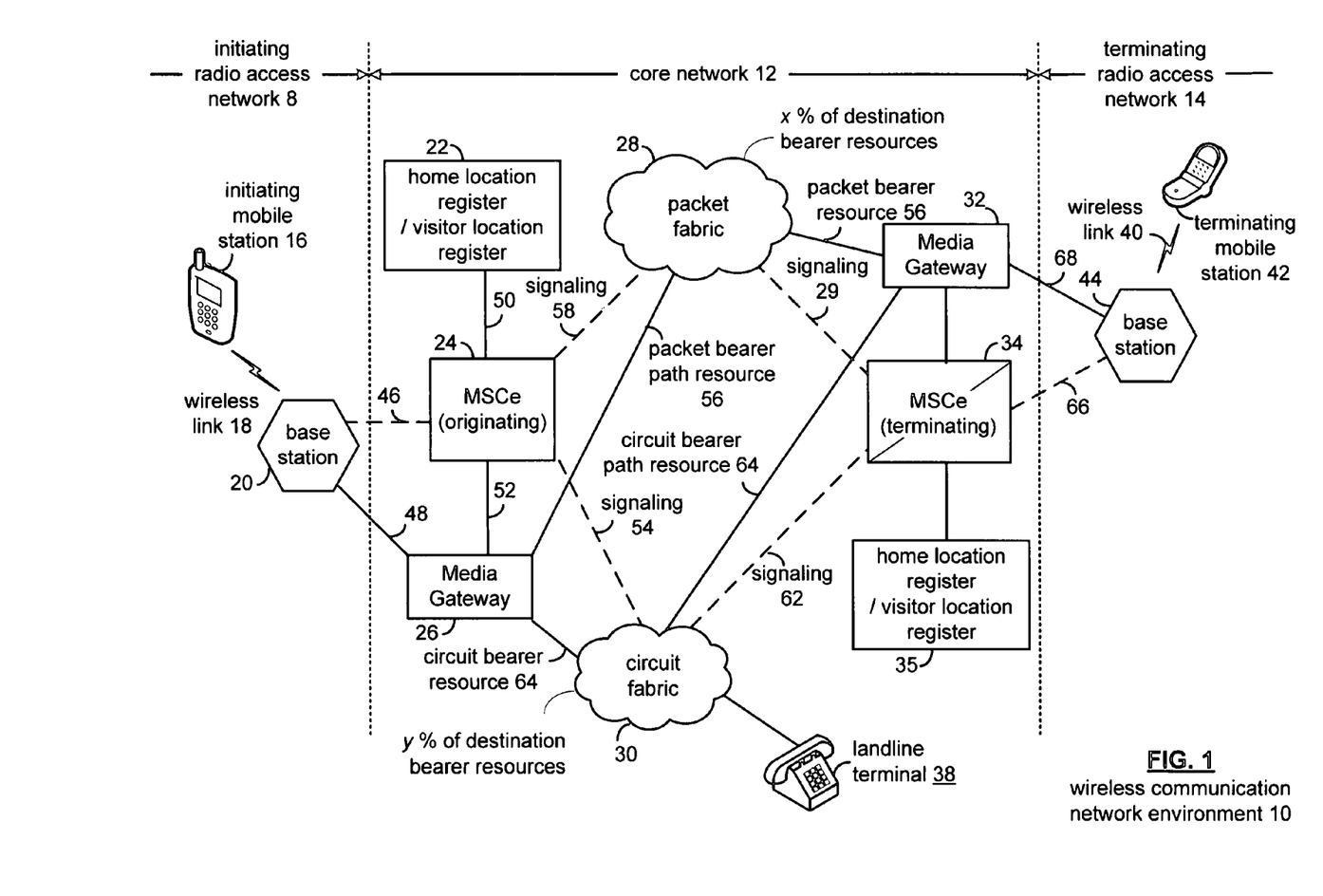
FIG. 1 is a functional block diagram of a communication network formed according to an embodiment of the invention.

FIG. 1 is a functional block diagram of a communication network formed according to an embodiment of the invention. The wireless communication network environment 10 is a next generational network that includes components that, in addition to legacy network protocols (such as Integrated Services Digital Network User Part ("ISUP"), the call control portion of Signaling System 7), also utilizes the Internet Protocol ("IP") as a network transport and IP-based call control protocols (for example, the Session Initiation Protocol ("SIP")).

The communications network 10 includes a code division multiple access ("CDMA") wireless access link that can use SIP and IP for call origination and termination operations. An example of such a network is a Legacy Mobile Station Domain ("LMSD"). As one of ordinary in the skill may appreciate, various mobile wireless networks may be deployed that may take advantage of the benefits realized by predictive and selective bearer resource matching. The wireless communications network is accessed with respect to the placement of a call to a mobile subscriber or by the initiation of a call by the mobile subscriber, and may be implemented by a variety of devices, such as a computer-based device, another mobile station, and/or a landline terminal.

The wireless communication network environment 10 includes an initiating radio access network 8, a core network 12, and a terminating radio access network 14 to provide for a call setup between an initiating mobile station 16 and a terminating mobile station 42.

The initiating radio access network 8 includes the initiating mobile station 16 and a base station 20. The initiating mobile station 16 couples to the base station 20 via a wireless link 18. The terminating radio access network 14 includes a terminating mobile station 42 and a base station 44. The terminating mobile station couples to the base station 44 via the wireless link 40. The base station 20 is discussed in detail with reference to FIG. 2. In general, the initiating radio access network 8 and the terminating radio access network 14 provide coverage to mobile stations over a specified geographic area via the core network 12.

For reducing costs and optimizing bearer path resources, an originating Mobile Switching Center emulation ("MSCe) seeks to match packet-based bearer resources from the call initiation source with packet-based bearer resources to the destination, and seeks matches of circuit-based bearer resources from the call origination with circuit-based bearer resources at the destination. Otherwise a MSCe introduces additional costs and inefficiencies when a circuit-based bearer resource is mismatched to a packet-based bearer resources because an InterWorking-Spectrum Peripheral Module ("IW-SPM") function is needed to provide communication between circuit-based devices and the packet-based devices by translating between the circuit-based protocols and the packet-based protocols, such as between PSTN, Internet, intranet, et cetera. Accordingly, a MSCe seeks to minimize mismatches of bearer path resources.

The core network 12 includes an originating mobile switching center emulation (MSCe) 24, a home location register/visitor location register ("HLR/VLR") 22, a media gateway 26, packet fabric 28, circuit fabric 30, a MSCe 34, a HLR/VLR 35, and a landline terminal 38.

The base station 20 interfaces to the core network 12 through the MSCe 24 via signaling 46 and bearer paths 48. Generally, the MSCe 24 is a flexible circuit switching platform that serves as a network node in the wireless communication network environment 10 to control voice/data path connections through the circuit fabric 30 and the packet fabric 28. A single MSCe may serve more than one base station 20, as well as provide both originating and serving MSCe functions depending on the allocation of resources in the core network 12.

The HLR/VLR 22 stores the mobile subscriber profiles, such as a calling party profile, and the services they are allowed to access, the location of the initiating mobile station 16, as well as identify roamers or visitors to the network that the MSCe 24 services. The calling party profile also indicates the codec capability of the mobile subscriber, such as indicating whether the mobile station is capable of voice operation via an enhanced variable rate codec ("EVRC") packet operation, which in turn permits Transcoder Free Operation ("TrFO") using the EVRC codec.

The MSCe 24, Media Gateways 32, HLR/VLR 22, MSCe 34, HLR/VLR 35, and Media Gateway 32 communicate call service information via the packet fabric 28 and/or the circuit fabric 30 via signaling links 29, 54, 58, and 62 through mobility application protocol specifications (for example, GSM MAP (Global System for Mobile communication-Mobile Application Part), ANSI-41, et cetera). The call service information includes seamless roaming with inter-system handoff, call delivery, validation, authentication, et cetera.

The media gateway ("MGW") 26 provides bearer functionality for voice calls in the call initiation network initiating radio access network 8. An example of bearer functionality includes the conversion of a voice data format into another voice data format, such as ITU-T (International Telecommunication Union-Telecommunication Standardization Sector) G.711. Such voice data formats are used when a voice call is established between the mobile station 16 through the base station 20, and the landline terminal 38 through the circuit fabric 30. Also, the MGW 26 supports the bearer traffic connectivity (for example, Internet Protocol ("IP") connectivity) to other mobile station communication networks, such as a LMSD, though packet fabric 28, and to landline devices through circuit fabric 30. The MGW 26 is also coupled to MSCe 24, which controls the bearer resources of MGW 26 through signaling (for example, the MEdia GAteway COntrol protocol ("MEGACO") or the ITU-T recommendation for MEGACO, which is H.248).

Generally, under MEGACO or H.248, the commands apply to terminations that are related to a "context." A termination sources and/or sends one or more streams of information. A context is an association between a collection of terminations. The context describes the topology (that is who hears/sees whom) and the media mixing and/or switching parameters for the cases where more than two terminations are involved with this association The originating MSCe 24 retrieves calling party profile and location information for the mobile stations it presently serves from the HLR/VLR 22.

The MSCe 24, acting as an originating MSCe, interacts with the MSCe 34, which acts as a terminating MSCe, through signaling links 29, 54, 58, and 62 to allocate the packet bearer path resource 56 and the circuit bearer path resource 64. The packet bearer path resource 56 and the circuit bearer path resource 64 represent the available bearer resources associated with the call termination identifier, which the initiating mobile station 16 transmits in requesting a call setup to the terminating mobile station 42. The packet fabric 28 provides x % of the destination bearer resources, and the circuit fabric 30 provides y % of the destination bearer resources.

Notably, a wireless communications network environment 10 that may have initially been based upon circuit-based network architectures that provided only trunk bearer path resources for call setups, may have since been modified and/or evolved to a combination of packet bearer and circuit bearer resources that are available for a call setup based upon the call termination identifier (such as a Session Initiation Protocol ("SIP") Invite message, a SIP Uniform Resource identifier ("URI"), an Interopetability Specification ("IOS") message for CDMA2000 access network interfaces, a telephone number, et cetera).

The packet fabric 28 is a data network where data, arranged in a packet form, is routed between nodes over data links that may be shared between the nodes. An example of a packet fabric 28 include the Public Internet (which uses Internet Protocol ("IP") based communications), Asynchronous Transfer Mode ("ATM") based networks, et cetera. The packet fabric 28 provides signaling connectivity (such as SIP connectivity) to other mobile communications networks, such as a LMSD network.

The circuit fabric 30 is a network based upon circuit switching methodologies where dedicated connections between nodes are established for the duration of a communication dialog, such as with the local, long distance, and international phone systems. The circuit fabric 30 provides signaling connectivity to landline devices, such as the landline terminal 38. The circuit fabric 30, such as a public switched telephone network ("PSTN") uses intelligent network protocols for call delivery, such as the Signaling System No. 7 ("SS#7"). Intelligent networking is a method for providing and interpreting information within a distributed network. The North American variant of this protocol is referred to as "SS7" (without the "#"). The SS7 protocol employs a dedicated data circuit to carry packetized machine language messages about each call connected between and among machines of a network to achieve connection control. Intelligent network applications are built upon this protocol, and include call control and transaction capabilities that support database access as well as a variety of intelligent network functions and wireless telecommunications services.

Also, as one of ordinary skill in the art may appreciate, the packet fabric 28 and the circuit fabric 30 provide access to other networks and/or termination devices beyond those illustrated by the example of FIG. 1.

In general, dissimilar percentages of circuit-based bearer path resources (that is, trunks) and packet-based bearer path resources may be associated with a call termination identifier—that is, a terminating MSCe having a greater number of circuit-based bearer path resources than packet-based bearer path resources. The resource allocation based upon the installed-base, or mix, may change over time, affecting the percentage of circuit bearer path resources 64 and packet bearer resources 56 that may be associated with a call termination identifier. Examples of factors that affect the availability of resources include the installed base and the traffic load. The traffic load can be affected by the time of day (for example, day time traffic is more active than night time traffic), special events (popular contests on evening programming), et cetera.

Accordingly, a given call termination identifier may include an installed base having circuit bearer path resources 64 of be eighty-percent, and packet bearer path resources 56 of twenty-percent. As another example, another call termination identifier may include an installed base having circuit bearer path resources 64 of ninety-percent and packet bearer path resources 56 of ten-percent.

In general, the wireless communication network environment 10, through an originating MSCe 24, uses predictive bearer path resource matching to designate a bearer path from the initiating mobile station 16 to the terminating mobile station 42. In contrast, the wireless communication network environment 10, through a terminating MSCe 34, uses selective bearer path resource matching to designate the bearer path from the terminating mobile station 42 to the initiating mobile station 16.

Predictive bearer path resource matching is based upon the probability of a bearer resource being available, and a preference indication by topology tables associated with a call termination identifier. That is, the MSCe 24 assigns resources on the originating side in a predictive manner, because it may be forwarded to a "non-matched" bearer path resource to the termination.

Selective bearer path resource matching is more certain with respect to the bearer path match. Because the MSCe 34 receives the call routing information for the call termination identifier, the MSCe 34 selects resources matching the resources selected by the originating MSCe 24. That is, a frame of reference from the terminating MSCe 34 illustrates that the return bearer path is setup by the originating leg.

With respect to wireless mobile communications networks (such as those under the TIA-136 and TIA-2000 specifications) utilize ANSI-41 as a signaling protocol that provides transaction-based operations to support subscriber mobility in the wireless telecommunications network.

For call initiation, the base station 20, the MSCe 24, MGW 26, and the HLR/VLR 22 provide subscriber mobility services to the initiating mobile station 16. ANSI-41 allows a subscriber to move between networks while a call is in progress, allows subscribers to originate calls while roaming (that is, operating their mobile devices in a system other than the home system where the subscription was established), allows subscribers to receive calls while roaming, and allows subscribers to activate and use supplementary call features while roaming (for example, call forwarding).

Figure 2:
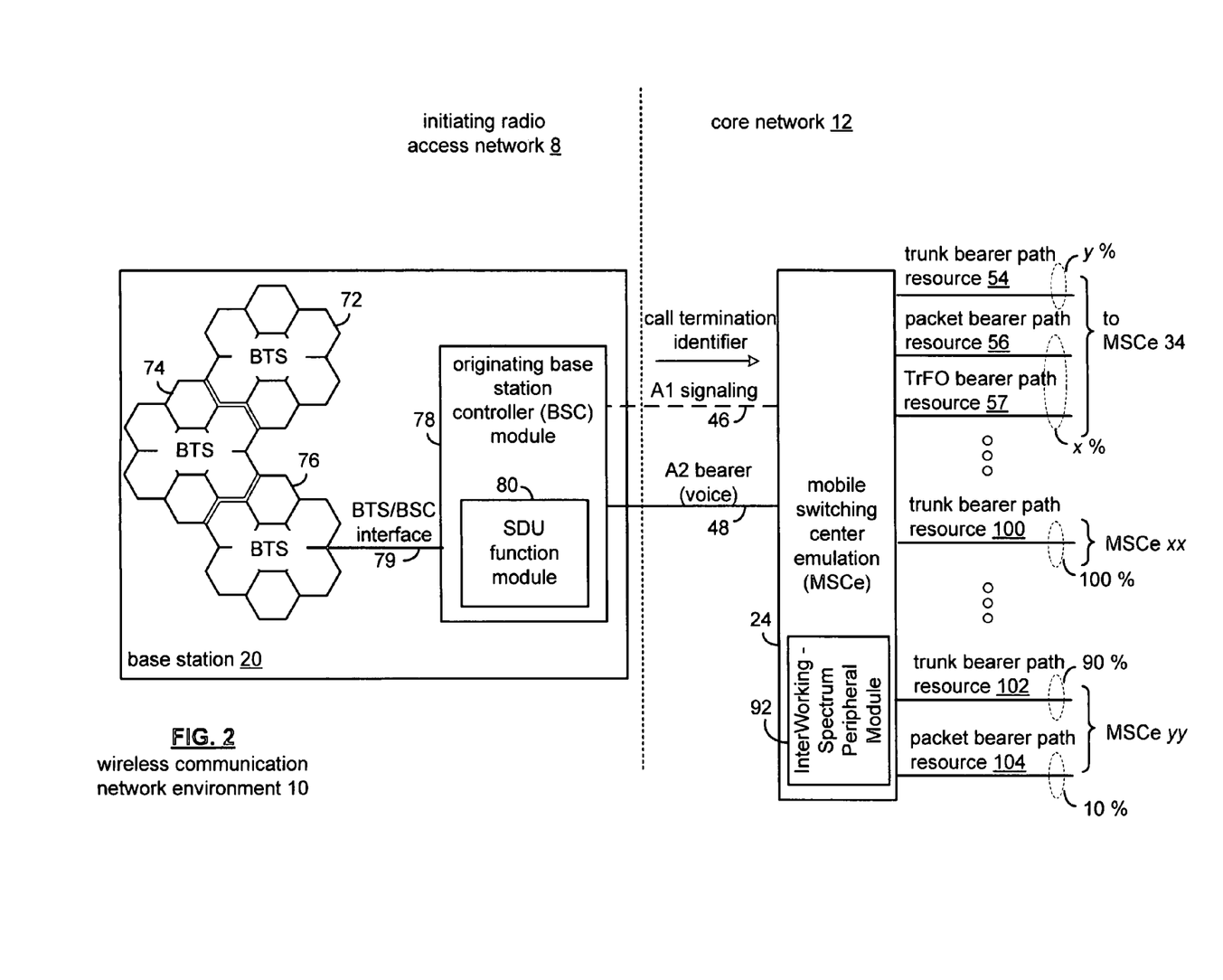
FIG. 2 is a functional block diagram of a base station and a Mobile Switching Center emulation ("MSCe") according to an embodiment of the invention.

FIG. 2 is a functional block diagram of a base station 20 and an originating Mobile Switching Center emulation ("MSCe") 24 according to an embodiment of the invention. The base station 20 of the initiating radio access network 8 includes a base station controller ("BSC") module 78 and a plurality of base transceiver stations ("BTS") 72, 74, and 76. The BSC module 78 includes a selection/distribution unit ("SDU") function module 80. The Mobile Switching Center emulation ("MSCe") of the core network 12 includes an InterWorking-Spectrum Peripheral Module (IW-SPM) 92.

The plurality of BTS 72, 74, and 76 are coupled to the BSC module 80 via a BTS/BSC interface 79. In operation, the BSC module 78 registers mobile stations in a cell (or BTS), assigns control and traffic channels, perform handoff and process call setup and termination, and supervises the functioning and control of the plurality of BTS. The plurality of BTS includes radio transmission and reception circuitry for providing coverage to a geographic area in the control of the BSC module 78. The SDU function module functions to provide traffic handling, layer 2 functionality, multiplex and demultiplex user traffic and signaling traffic, forward and reverse link power control, frame selection and distribution for soft handoffs, et cetera.

The base station 20 is coupled to the MSCe 24 by an "A" interface including an A1 signaling link 46, an A2 bearer link 48, and an A5 bearer link 50. The A1 signaling link 46 carries signaling information between the call control and mobility management functions of the MSCe 24 and the BSC module 78. The A2 bearer link 48 carries voice/data information (voice/data) between the "switch" component of the MSCe 24 and one of: the channel element component of the base station 20 (in the case of an analog air interface), and the Selection/Distribution Unit (SDU) function module 80 (in the case of a voice call over a digital air interface).

The MSCe 24 couples to an interworking function module 92, which operates to provide seamless communication between devices supporting dissimilar protocols, such as those for packet fabric 28 and circuit fabric 30.

The MSCe 24 provides the signaling functionality equivalent to that defined for a legacy MSC (that is, a 3GPP2 call control entity that only supports circuit-switched operations). Part of the signaling functionality supported by MSCe 24 includes the establishment, maintenance and termination of voice calls, the ability to modify an established call (for example, establishing three-way call after establishing a two-way call), and triggers to other network elements for the support of subscriber specific features (for example, prepaid calling). When bearer path resource mismatches occur (such as a circuit bearer path resource from the mobile station to the MSCe 24 and a packet bearer path resource from the MSCe 24 to the next node of the wireless communication network environment 10), the MSCe 24 engages an InterWorking-Spectrum Peripheral Module ("IW-SPM") 92 to facilitate bearer path communications between the two disparate communication paths.

The MSCe 24 couples to other Mobile Switching Center emulators 34, xx, and yy, each of the Mobile Switching Center emulators having associated dissimilar bearer path resources accessible through a call termination identifier provided by the BSC module 78. Examples of the dissimilar bearer path resources include trunk bearer path resources based upon circuit fabric protocols (for example, PSTN) and packet bearer path resources based upon packet fabric protocols (for example, ANSI-41).

Variants of the bearer path resources may be present as well. For example packet fabric protocols may include a Transcoder Free Operation ("TrFO") variant. Generally, a network uses a transcoder to change the information encoding from one encoding scheme to another (for example, for different rates and codecs such as those under the enhanced 2G codec under the IS-733 specification (also referred to as QCELP13K) that includes a full-rate of 13.3 kbit/s, a half-rate of 6.2 kbit/s, a quarter-rate of 2.7 kbit/s, and a one-eighth-rate of 1.0 kbit/s, the SMV coder under the IS-893 specification that also includes different rates, et cetera). Transcoding has the disadvantage of introducing signal distortion, but is used when a single CODEC is not available from the source mobile station to the terminating mobile station for the network to provide a comprehensible voice stream at both ends. With a TrFO packet bearer path variant, both ends of the voice call use the same coding so that transcoding is unnecessary. To allow the transport of information in a TrFO mode, the wireless communication network environment 10 may use suitable signaling protocols (for example, Bearer Independent Call Control ("BICC")) to convey codec information to the affected nodes in a bearer path.

Different geographic regions of a network may have different network topologies. For example, the MSCe 24 may couple to the MSCe 34 via a trunk bearer path resource 54, a packet bearer resource 56, or a Transcoder Free Operation ("TrFO") bearer path resource 57; to the MSCe xx via a trunk bearer path resource 100, and the MSCe yy via a trunk bearer path resource 102 and a packet bearer path resource 104.

In the present example, the MSCe 24 may be in a first predictive bearer path matching mode, or in a second predictive bearer path matching mode to provide flexible bearer path resource accommodations across the wireless communication network environment 10. The mode is indicated by a customer preference as to the manner of bearer path resource use.

In the first mode, the MSCe 24 generates a bearer resource preference list based upon the call termination identifier to provide a predetermined priority order of identifiers for the bearer path resources 54, 56, and 57. In the second predictive bearer path matching mode, the MSCe 24 generates a bearer resource preference list based upon the bearer path that the MSCe 24 selects. The bearer resource preference list is sent to the originating BSC module 78, which matches an available bearer path resource of the BSC module 78 based upon the bearer resource preference list.

The bearer resource preference list represents the selection of the MSCe 24 based upon the call termination identifier for predictive bearer bath resource matching. That is, the bearer resource preference list is predictive in nature because although a best match is assigned based upon the predetermined priority order of the bearer path resources, a mismatch may still ultimately result due to the realities of bearer path availability (such as being present traffic load exceeding expectations, maintenance down-time, et cetera). Nevertheless, instilling the originating MSCe with a tendency to seek bearer resource matches increases resource efficiency for the network overall.

When a mismatch does result, however, the IW-SPM 92 provides communication between the devices supporting dissimilar protocols (such as call placed on a packet basis from the BSC module 78, but the available trunk type through the MSC 24 is trunk based (that is, PSTN)).

In operation, the terminating MSCe 34 provides the originating MSCe 24 with a plurality of possible bearer path resources—the packet bearer path resource 56 and TrFO bearer path resource 57 via the packet fabric 28, and the trunk bearer path resource 54 via the circuit fabric 30. Further to the example, the trunk bearer path resource 54 is eighty-percent of the bearer path resources to the MSCe 34, and the packet bearer path resource 56 and the TrFO bearer path resource 57 provide the remaining twenty-percent of the bearer path resources. Accordingly, when receiving a circuit-based call initiation from the mobile station 16, the MSCe 24 generates a bearer resource preference list having a priority order of the trunk bearer path resource 54, the packet bearer path resource 56, and then the TrFO bearer path resource 57.

With respect to priority order, some bearer paths have a lower value (that is, a higher cost) for a particular option, but when there is high-availability with respect to other bearer path resources, then there is a preference to utilize the resource, making available "less available" bearer path resources. Availability may be based upon the statically installed base, on the variable availability through call traffic patterns to setup a terminating call, or a combination thereof. For example, during night-time hours, resources may not be heavily utilized as the call traffic is lower. If the traffic is low, the potential availability is greater to use the resource (such as a TrFO bearer path resource).

As another example, different call termination identifiers have different possible bearer path resources, such as with respect to packet bearer path resources that may include a TrFO option for packet-based delivery. Based upon the call termination identifier, the geographic area may have a high probability of supporting TrFO packet operation due to the installed base for the area (such as eighty-percent to one-hundred-percent of the terminating MSCe have TrFO capability), and others have a lower probability due to the installed base (such as perhaps thirty-percent of the terminating MSCe have TrFO capability).

The priority order of the bearer path resources can be based upon availability, cost, the call termination identifier (for example, a "9-1-1" identifier), et cetera. In the lowest cost routing is achieved by matching the bearer resources (that is, packet-based to packet-based, circuit-based to circuit-based), thus avoiding interface transitions such as via an interworking function. As a further option, the priority order may be that if there is no bearer path resource match is available (such as the lowest cost) then an alternate option is to not provide or select a bearer path for the initiating mobile (that is, an incomplete call).

Instances where some of the MSCe devices servicing a geographic area have less bearer path resource options, such as having only a trunk bearer path resource option (that is, one-hundred percent trunk access) requiring an interworking function to service an initiating mobile that starts with a packet-based trunk resource through the BSC. Limited bearer path resources are those with some, but not all, of the possible bearer path resource options, such as the MSCe xx that includes only a trunk bearer path resource, or such as the MSCe yy that includes a trunk bearer path resource and a packet bearer path resource, but not TrFO bearer path resource capability.

Figure 3:
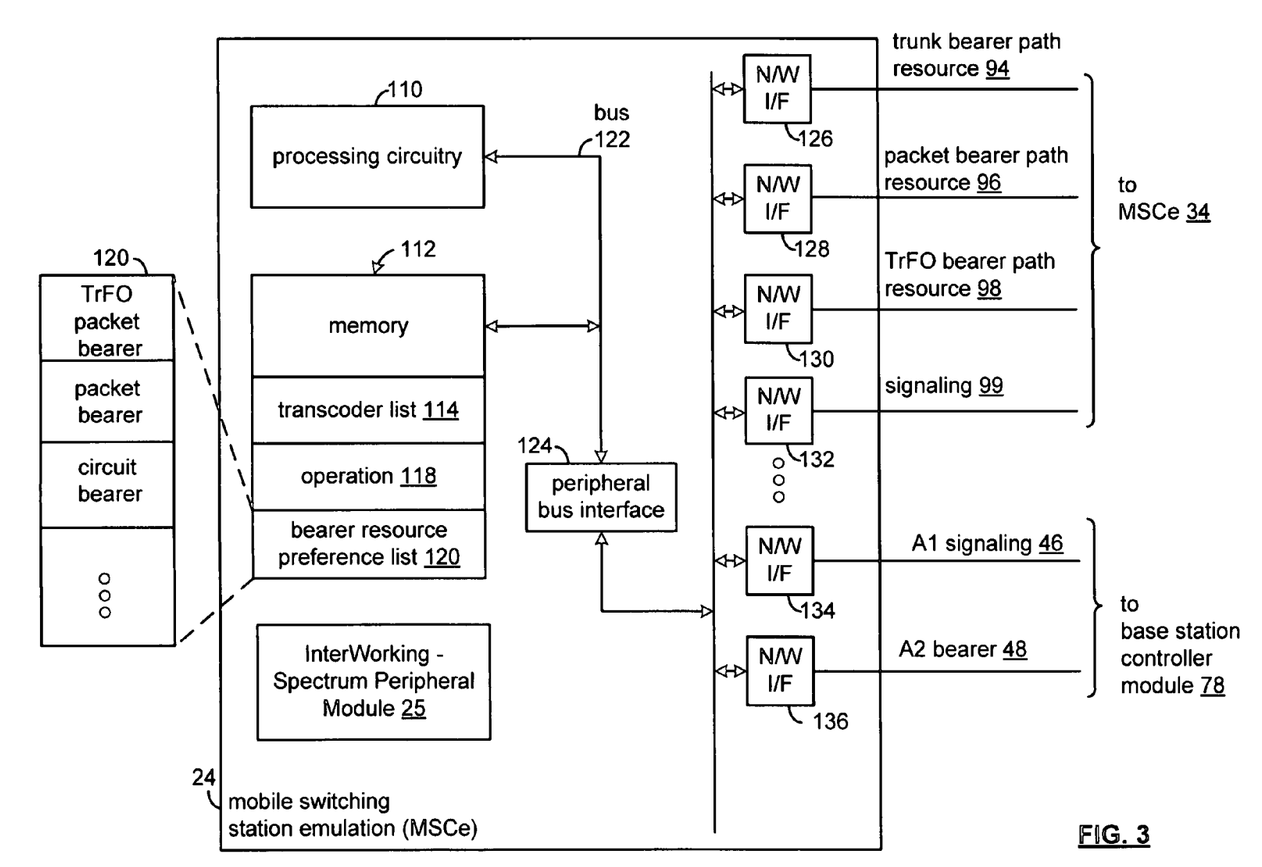
FIG. 3 is a functional block diagram of a MSCe according to an embodiment of the invention.

FIG. 3 is a functional block diagram of an MSCe 24 that includes processing circuitry 110, memory 112, a peripheral bus interface 124, and network interfaces 126 through 136. The processing circuitry 110, in combination with operational instructions stored in memory 112 and accessed via the bus 122, executes MSCe functions. The MSCe functions include, but are not limited to, basic switching functions, call establishment coordination to and from wireless subscribers, transmission facilities management, mobility management, and/or call processing functions. The MSCe 24 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 112 may be a single memory device or a plurality of memory devices. Such a memory device may be a read-only memory, random access memory, volatile memory, non-volatile memory, static memory, dynamic memory, flash memory, and/or any device that stores digital information.

The memory 112 includes a transcoder list 114, operation logic 118, and a bearer resource preference list 120. The operation logic includes logic for communicating through at least one network interface utilizing standardized protocols. The MSCe 24 includes a plurality of network ports labeled as network I/Fs (interfaces) 126 through 136.

The network I/Fs interface to bearer and signaling circuits for call setup. For example, the MSCe 24 couples to a MSCe 34 via the network I/F 126 to trunk bearer path resource 94, via the network I/F 128 to packet bearer path resource 96, via the network I/F 130 to the TrFO bearer path resource 98, and via the network I/F 132 to signaling path 99. The MSCe 24 couples to the base station control module via network I/F 134 to A1 signaling path 46, and via network I/F 136 to A2 bearer path 48.

In operation, with respect to a call setup between the initiating mobile station 16 and the terminating mobile station 42, the MSCe 24 receives a transcoder list for mobile station intercommunication with a mobile station through one of the network interfaces such as the A1 signaling path 46. The MSCe 24 forwards the transcoder list 114 through the network wireless communication network environment 10 through another interface of the network interface, such as the signaling path 99. The originating MSCe 24 also includes operational logic that enables it to act as an Originating MSCe 24, and/or a terminating (serving) MSCe 34.

In general, the MSCe 24 is operable to provide a first and a second predictive bearer path matching mode, which is discussed in detail with reference to FIG. 4. In operation, the originating MSCe 24 generates the bearer resource preference list 120 that includes a predetermined priority order of the bearer path resources, which in this example are bearer path resources 94, 96, and 98. The predetermined priority is based upon resource availability, which is affected by the installed base of the resource, the traffic load (such as a time-of-day call load, a special even call load, et cetera).

Figure 4:
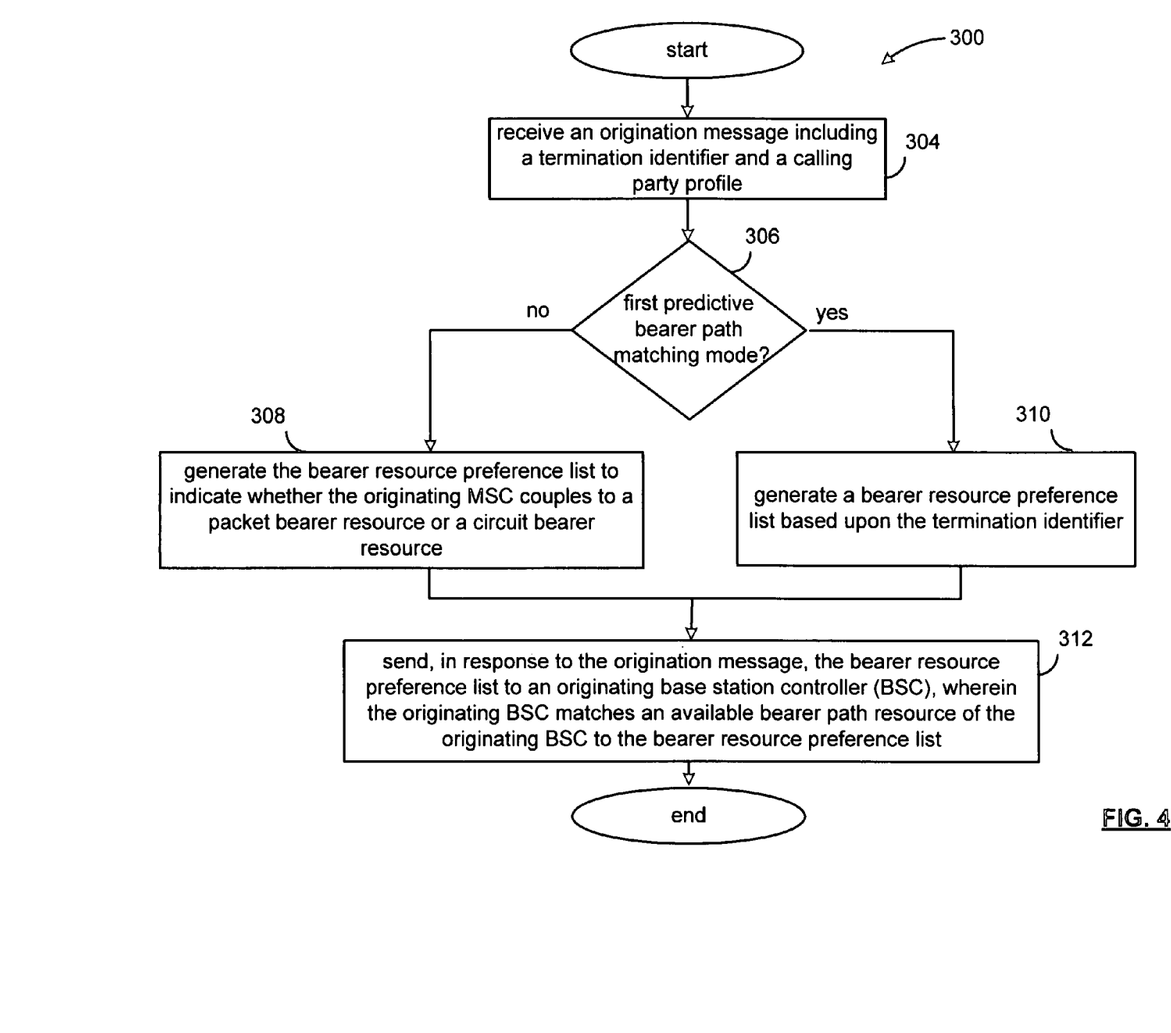
FIG. 4 is a flow diagram illustrating a method according to an embodiment of the present invention.

FIG. 4 is a flow diagram illustrating a method 300 according to an embodiment of the present invention. At step 304, the originating MSCe receives an origination message including a call termination identifier. At step 306, the predictive bearer path matching mode is determined. When the originating MSCe is in a first predictive bearer path matching mode, at step 310 the originating MSC generates a bearer resource preference list based upon the termination identifier. The bearer resource preference list includes a predetermined priority order of a plurality of bearer path resource identifiers including at least one of a packet bearer resource identifier and a circuit bearer resource identifier. The bearer path resource preference list 120 is generated by the MSCe 24 based upon the call termination identifier from the BSC module 80 (see FIG. 2). The priority of the bearer resources is based upon the installed base or topology of the core network supporting a terminating radio access network 14 (see FIG. 1). In general, in view of network upgrades towards packet-based transport, the core network may be heterogeneous in nature (that is, including trunk bearer path resources and packet bearer path resources. A packet bearer path resource may also provide TrFO bearer path resources, et cetera). In this regard, the bearer path resources may be based upon the probable availability (that is, install availability, availability in view of the traffic load, availability based on time of day, et cetera).

When the originating MSCe is in a second predictive bearer path matching mode, at step 308, the MSCe generates a bearer resource preference list to indicate whether the originating MSCe couples to a packet bearer resource or a trunk bearer resource. In this manner, the possible MSCe connections are placed within the bearer resource preference list. When a packet bearer path resource is coupled to the originating MSCe, the initiating mobile may be determined to be capable of transcoder free operation (TrFO) packet operation by searching intelligent voice service negotiation (IVSN) Priority Service Option List (PSOL) and Service Option (SO) mechanisms. When these mechanisms are not available, however, the originating MSCe considers the initiating mobile station as TrFO capable.

At step 312, the originating MSCe sends, in response to the origination message, the bearer resource preference list to an originating base station controller (BSC). The originating BSC matches an available bearer path resource of the originating BSC based upon the bearer resource preference list. In this manner, the originating MSCe engages in predictive bearer path resource matching to recognize efficiency and cost reduction in bearer path resources for call setup.

Figure 5:
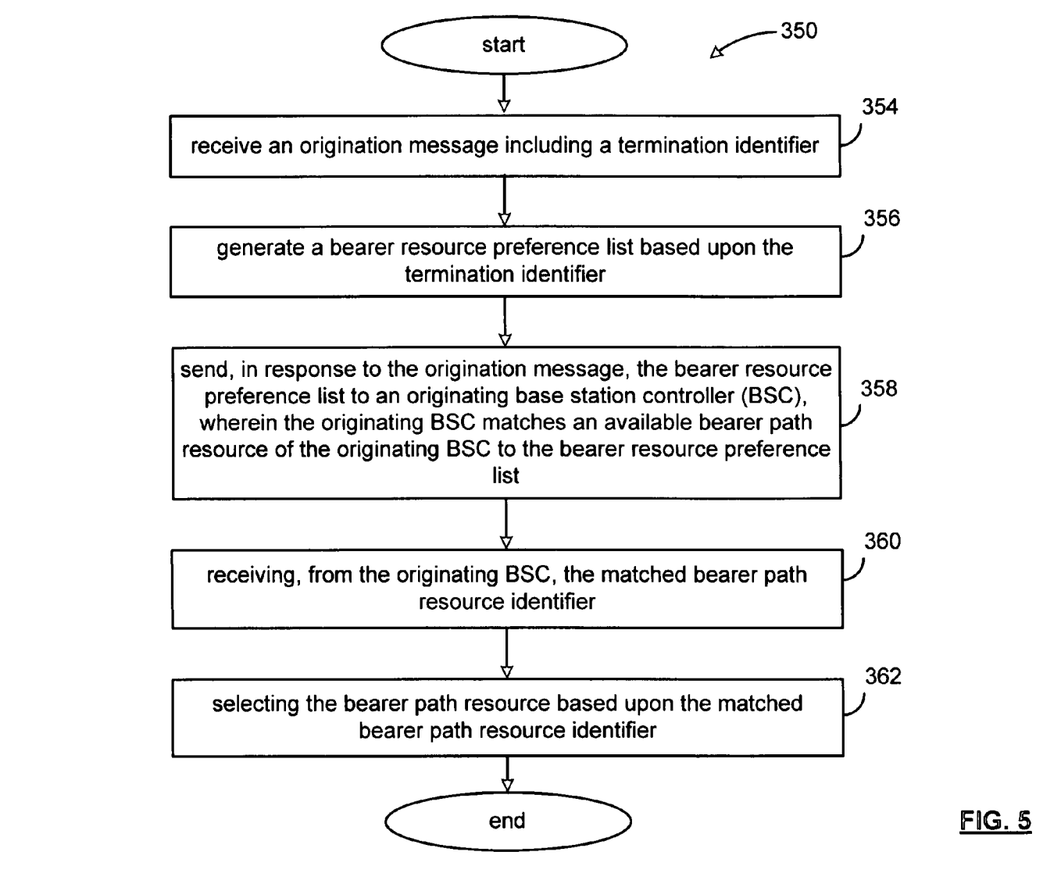
FIG. 5 is a flow diagram illustrating another method according to an embodiment of the present invention.

FIG. 5 is a flow diagram illustrating a method 350 according to an embodiment of the present invention. At step 354, an originating MSCe receives an origination message including a call termination identifier, and generates, at step 356, a bearer resource preference list based upon the call termination identifier. The bearer resource preference list includes a predetermined priority preference order of bearer resource identifiers that include at least a packet bearer resource identifier and a trunk bearer resource identifier. The bearer path resource preference list 120 is generated by the MSCe 24 based upon the call termination identifier from the BSC module 80 (see FIG. 2). The bearer path resource priorities are based upon the installed base or topology of the core network supporting a terminating radio access network 14 (see FIG. 1). In general, for predictive trunk matching, the core network will be heterogeneous in nature (that is, including trunk bearer path resources and packet bearer path resources, where a packet bearer path resource may also provide TrFO bearer path resources, et cetera). In this regard, the bearer path resources priorities may be based upon the probable availability (that is, install availability, availability in view of the traffic load, availability based on time of day, et cetera). At step 358, the originating MSCe sends, in response to the origination message, the bearer resource preference list to an originating base station controller (BSC). The originating BSC matches an available bearer path resources of the originating BSC with an identifier of the plurality of bearer resource identifiers. The originating MSCe then receives at step 360 from the originating BSC the matched bearer path resource identifier and selects at step 362 the bearer path resource based upon the matched bearer path resource identifier.

The invention disclosed herein is susceptible to various modifications and alternative forms. Specific embodiments therefore have been shown by way of example in the drawings and detailed description. It should be understood, however, that the drawings and the detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for predictive bearer path resource matching for call setup in an originating mobile switching center emulation (MSCe) of a wireless communication network including a circuit fabric and packet fabric, the method comprising:
    receiving an origination message including a call termination identifier and a calling party profile including call setup capabilities of a calling party from an originating base station controller (BSC);
    when in a first predictive bearer path matching mode, generating a bearer resource preference list based upon the call termination identifier, the bearer resource preference list includes a predetermined priority order of a plurality of bearer path resource identifiers including at least one of a packet bearer resource identifier and a trunk bearer resource identifier;
    when in a second predictive bearer path matching mode, generating the bearer resource preference list with a bearer path resource identifier to indicate whether the originating MSCe couples to a packet bearer resource or a trunk bearer resource; and
    sending, in response to the origination message, the bearer resource preference list to the originating BSC for matching with an available bearer path resource.

2. The method of claim 1 further comprising:
    receiving, from the originating BSC, the matched bearer path resource identifier from the originating BSC; and
    selecting the matched bearer path resource based upon the matched bearer path resource identifier.

3. The method of claim 1 wherein the origination message further includes a calling party profile including call setup capabilities, and wherein generating the bearer resource preference list further comprises:
    when the bearer resource preference list includes a packet bearer resource identifier, accessing the calling party profile to determine whether the call termination identifier indicates transcoder free operation (TrFO) packet operation; and
    when the calling party profile indicates a TrFO packet operation capability, including with the bearer resource preference list a TrFO packet bearer resource identifier.

4. The method of claim 3 wherein the calling party profile indicates TrFO packet operation by an enhanced variable rate codec (EVRC) indication.

5. The method of claim 1 wherein the origination message is a Session Initiation Protocol (SIP) INVITE message.

6. The method of claim 5 wherein the call termination identifier is at least one of a SIP Uniform Resource Identifier (URI) and a called number.

7. The method of claim 1 wherein the first predictive bearer path matching mode comprises a concurrent trunk matching mode and the second predictive bearer path matching mode comprises a non-concurrent trunk matching mode.

8. A method for predictive bearer path resource matching by an originating mobile switching center emulation (MSCe) in a wireless communication network including a circuit fabric and packet fabric, the method comprising:
    receiving an origination message including a call termination identifier from an originating base station controller (BSC);
    generating a bearer resource preference list based upon the call termination identifier, the bearer resource preference list includes a predetermined priority preference order of a plurality of bearer resource identifiers, the plurality of bearer resource identifiers including at least a packet bearer resource identifier and a trunk bearer resource identifier;
    sending, in response to the origination message, the bearer resource preference list to the originating BSC, for matching an available bearer path resource;
    receiving, from the originating BSC, the matched bearer path resource identifier; and
    selecting the bearer path resource based upon the matched bearer path resource identifier.

9. The method of claim 8 further comprising:
    sending the selected bearer path resource identifier through to a terminating MSCe based upon the selected bearer resource, the terminating MSCe, based upon the selected bearer path resource, identifies an appropriate priority resource list to a terminating BSC for selecting a terminating bearer path resource.

10. The method of claim 8 wherein the origination message further includes a calling party profile including call setup capabilities, and wherein generating the bearer resource preference list further comprises:
    when the bearer resource preference list includes a packet bearer resource identifier, accessing the calling party profile to determine whether the call termination identifier indicates transcoder free operation (TrFO) packet operation; and
    when the call termination identifier indicates TrFO packet operation, including with the bearer resource preference list a TrFO packet bearer resource identifier.

11. The method of claim 10 wherein the call termination identifier indicates TrFO packet operation by an enhanced variable rate codec (EVRC) indication.

12. The method of claim 8 wherein the origination message is a Session Initiation Protocol (SIP) INVITE message.

13. The method of claim 12 wherein the call termination identifier is at least one of a SIP Uniform Resource Identifier (URI) and a called number.

14. A mobile switching center emulation (MSCe) in a wireless communication network including a circuit fabric and a packet fabric comprising:
    network interface circuitry for intercommunicating with the circuit fabric and the packet fabric of the wireless communication network;
    processing circuitry coupled to the network interface circuitry for processing data to and from the wireless communication network;
    memory coupled to the processing circuitry, wherein the memory stores operational instructions that cause the processing circuitry to:
        receive an origination message including a call termination identifier from an originating base station controller (BSC);
        generate a bearer resource preference list based upon the call termination identifier and a calling party profile including call setup capabilities, which includes a predetermined priority preference order of a plurality of bearer path resource identifiers including at least one of a packet bearer resource identifier and a trunk bearer resource identifier;
        send, in response to the origination message, the bearer resource preference list to the originating BSC for matching with an available bearer path resource;
        receive, from the originating BSC, the matched bearer path resource identifier; and
        select the bearer path resource based upon the matched bearer path resource identifier.

15. The MSCe of claim 14 wherein the memory further stores operational instructions that cause the processing circuitry to:
  send the selected bearer path resource identifier through to a terminating MSCe based upon the selected bearer resource, the terminating MSCe, based upon the selected bearer path resource, identifies an appropriate priority resource list to a terminating BSC, which selects a terminating bearer path resource based upon the appropriate priority bearer path resource list and the terminating bearer path resources available at the terminating BSC.

16. The MSCe of claim 14 wherein operational instructions that cause the processing circuitry to generate the bearer resource preference list further comprise:
  when the bearer resource preference list includes a packet bearer resource identifier, accessing the calling party profile to determine whether the call termination identifier indicates transcoder free operation (TrFO) packet operation;
  when the call termination identifier indicates TrFO packet operation, including with the bearer resource preference list a TrFO packet bearer resource identifier.

17. The MSCe of claim 14 wherein the calling party profile indicates TrFO packet operation by an enhanced variable rate codec (EVRC) indication.

18. The MSCe of claim 14 wherein the origination message is a Session Initiation Protocol (SIP) INVITE message.

19. The MSCe of claim 18 wherein the call termination identifier is at least one of a SIP Uniform Resource Identifier (URI) and a called number.

20. The MSCe of claim 14 wherein the origination message is an Interoperability Specification (IOS) message.

* * * * *